(12) United States Patent
Krstic et al.

(10) Patent No.: US 10,875,565 B2
(45) Date of Patent: Dec. 29, 2020

(54) STEERING ARRANGEMENT

(71) Applicant: Volvo Car Corporation, Gothenburg (SE)

(72) Inventors: Daniel Krstic, Gothenburg (SE); Johan Svensson, Mölnycke (SE)

(73) Assignee: Volvo Car Corporation, Göteborg (SE)

( * ) Notice: Subject to any disclaimer, the term of this patent is extended or adjusted under 35 U.S.C. 154(b) by 98 days.

(21) Appl. No.: 16/243,145

(22) Filed: Jan. 9, 2019

(65) Prior Publication Data

US 2019/0210631 A1    Jul. 11, 2019

(30) Foreign Application Priority Data

Jan. 10, 2018    (EP) .................................... 18150931

(51) Int. Cl.
  *B62D 1/16*    (2006.01)
  *B62D 1/20*    (2006.01)

(52) U.S. Cl.
  CPC . *B62D 1/16* (2013.01); *B62D 1/20* (2013.01)

(58) Field of Classification Search
  CPC ... B62D 1/16; B62D 1/20; B62D 1/18; B62D 1/183
  USPC .......................................................... 74/492
  See application file for complete search history.

(56) References Cited

U.S. PATENT DOCUMENTS

| | | | |
|---|---|---|---|
| 5,377,555 A | 1/1995 | Hancock | |
| 5,560,650 A * | 10/1996 | Woycik | B62D 1/192 280/777 |
| 8,844,400 B2 * | 9/2014 | Morinaga | B62D 1/181 74/495 |
| 2007/0068309 A1 * | 3/2007 | Koliqi | B62D 1/16 74/492 |
| 2009/0158880 A1 * | 6/2009 | Myers | B62D 1/16 74/492 |
| 2010/0061797 A1 * | 3/2010 | Wright | B60Q 1/1461 403/192 |
| 2014/0311273 A1 * | 10/2014 | Nagasawa | B22D 19/045 74/492 |
| 2014/0318302 A1 * | 10/2014 | Watanabe | B62D 1/184 74/493 |

(Continued)

FOREIGN PATENT DOCUMENTS

| | | |
|---|---|---|
| EP | 2716520 A1 | 4/2014 |
| WO | 2015018781 A1 | 2/2015 |
| WO | 2016091642 A1 | 6/2016 |

OTHER PUBLICATIONS

Jun. 15, 2018 European Search Report issue on International Application No. EP18150931.

*Primary Examiner* — James A English
*Assistant Examiner* — Kurtis Nielson
(74) *Attorney, Agent, or Firm* — Clements Bernard Walker; Christopher L. Bernard

(57) ABSTRACT

A steering arrangement for a vehicle, the steering arrangement comprising a steering column bracket comprising a pair of bracket walls, each of the bracket walls being arranged in connection with a respective one of steering column walls, wherein the steering column bracket comprises a laterally movable resilient member on each of the bracket walls, each of the laterally movable resilient members being snap-fitted to a respective one of laterally extending recesses of the steering column for attaching the steering column bracket to the steering column.

14 Claims, 4 Drawing Sheets

(56) References Cited

U.S. PATENT DOCUMENTS

| | | | |
|---|---|---|---|
| 2016/0185377 A1* | 6/2016 | Johr | B62D 1/185 |
| | | | 74/493 |
| 2017/0282957 A1 | 10/2017 | Matsuno et al. | |
| 2018/0154922 A1* | 6/2018 | Abonyi | B62D 1/20 |
| 2019/0145456 A1* | 5/2019 | Mark | B62D 1/16 |
| | | | 464/162 |
| 2020/0023881 A1* | 1/2020 | Ishikawa | B62D 1/16 |

* cited by examiner

STEERING ARRANGEMENT

CROSS-REFERENCE TO RELATED APPLICATION

The present patent application/patent claims the benefit of priority of co-pending European Patent Application No. 18150931.6, filed on Jan. 10, 2018, and entitled "A STEERING ARRANGEMENT," the contents of which are incorporated in full by reference herein.

TECHNICAL FIELD

The present invention relates to a steering arrangement for a vehicle. The invention also relates to a vehicle comprising such steering arrangement.

BACKGROUND

In the field of vehicles, and particularly the field of cars, there is always a demand to improve various components in order to further improve the overall vehicle. There is also a continuous demand to simplify manufacturing of the various components, to both speed-up manufacturing as well as simplifying assembly of the various components.

The steering arrangement of the vehicle and its associated components is one particular such arrangement of the vehicle where there is a continuous strive of improving the product.

In particular, the steering arrangement often comprises a steering lock positioned on the steering column. The steering lock may have the dual function of acting as a bracket as well as a lock. The function as a bracket thus keeps various components in position. However, there are situations where the steering arrangement does not contain such steering lock. In order to maintain the components position, the use of steering column bracket is often conventional. The steering column bracket thus uses the connection portions of the steering column. However, the steering column bracket is relatively complexly connected to the steering column, in particular in cases where de-assembly thereof is desirable. In such situation, a relatively inaccessible screw needs to be disconnected between the steering column and the steering column bracket.

There is thus a desire to provide a steering arrangement which is simpler in its design and which can be connected to and disconnected from the steering column in a simplified manner.

SUMMARY

It is thus an object of the present invention to provide a steering arrangement which at least partially overcomes the above described deficiencies. This is achieved by a steering arrangement of the present invention.

According to a first aspect of the present invention, there is provided a steering arrangement for a vehicle, the steering arrangement comprising a steering column connectable to a steering wheel of the vehicle, the steering column comprises a pair of steering column walls, each of the steering column walls comprises a respective laterally extending recess; a steering lever connected to the steering column, wherein the steering lever is connectable to the wheels of the vehicle for controlling steering operation thereof; and a steering column bracket comprising a pair of bracket walls, each of the bracket walls being arranged in connection with a respective one of the steering column walls, wherein the steering column bracket comprises a laterally movable resilient member on each of the bracket walls, each of the laterally movable resilient members being snap-fitted to a respective one of the laterally extending recesses of the steering column for attaching the steering column bracket to the steering column.

The steering arrangement is thus in principle arranged to provide a steering action between the steering wheel of the vehicle to the steered wheels of the vehicle. Thus, the operator controls the steering wheel, which motion is transmitted to the steering wheel axle via the steering column and the steering lever. The steering level is thus not directly connected to the wheel of the vehicle, but connected thereto via the steering wheel axle, as well as other components familiar to the skilled person.

The steering column bracket is thus an arrangement configured to connect and hold various arrangements of the vehicle at fixed positions. Such arrangements may preferably relate to e.g. cabling arrangement in the vicinity of the steering wheel, etc. Other arrangements are also conceivable, such as e.g. a steering wheel casing as will be described further below. The steering column bracket is thus particularly useful when the vehicle does not contain a steering lock.

Furthermore, the resilient member should be understood to relate to a member that comprises springing characteristics. The resilient member can thus be compressed and expand when placed in its connected position to the steering column.

An advantage is thus that the use of screw connections for connecting the steering column bracket to the steering column is no longer needed. Hence, a simplified connection between the steering column bracket and the steering column is achieved where no tools for fixating the two parts to each other is needed. The inventors of the present disclosure have also realized that assembly of the steering column bracket to the steering column can be made from substantially any desirable angle of the steering column bracket relative to the steering column. Also, removal of the steering column bracket from the steering column merely requires an operator to provide a compression force onto the resilient member and pull the steering column bracket relative to the steering column. Hence, removal of the steering column bracket does not involve the use of loosing the grip of a screw connection, etc., hence, more simplified.

According to an example embodiment, the steering column may be at least partially enclosing the steering column bracket.

The wording "partially enclosing" should be construed as the walls of the steering column at least partially overlaps the walls of the steering column bracket.

According to an example embodiment, each of the laterally movable resilient members may form a respective integral part of the bracket walls.

An integral part should be construed such that the resilient members are stemming from the same piece of material as the steering column bracket. Thus, the resilient members are preferably formed by the same material as the rest of the steering column bracket. The steering column bracket may preferably be formed by a plastic material.

An advantage is thus that fewer components are required. Also, the steering column bracket and the resilient members may be formed in one piece, thereby simplifying manufacturing thereof, which in turn reduces the production costs.

According to an example embodiment, each of the laterally movable resilient members may be controllable between a first state in which the laterally movable resilient member is snap-fitted to the laterally extending recesses of the steering column, and a second state in which each of the laterally movable resilient members is arranged in abutment with a respective inner surface of the steering column walls.

Hence, when moving the steering column bracket into its position, the resilient members assume the second, compressed state. When the steering column bracket is arranged in its correct position, the resilient members assume the first, expanded state. Hence, in an unloaded condition, the resilient members also assume the first state.

According to an example embodiment, the laterally movable resilient members may protrude from a respective inner surface of the bracket walls when the laterally movable resilient members assume the second state.

The inner surface of the bracket walls is thus the surface facing away from the steering column wall. The resilient members thus protrude in a direction away from the steering column wall. Hereby, the resilient members are able to flex properly during assembling of the steering column bracket. In the first state, the resilient member may preferably protrude in a direction away form the outer surface of the bracket wall.

According to an example embodiment, each of the laterally movable resilient members may be arranged in a fully laterally extended position when assuming the first state.

According to an example embodiment, the laterally extending recess of the steering column may be a through hole extending through the steering column wall.

Hereby, the resilient members may be accessible for a user as the resilient members are positioned in the through holes.

According to an example embodiment, the laterally movable resilient members may be formed by means of a cut-through groove in the respective bracket walls.

The cut-through may thus be formed as a trace extending through the bracket wall. An advantage is that improved lateral flexibility of the resilient member is achieved.

According to an example embodiment, the cut-through groove may be formed as a horse shoe.

A horse-shoe shape can provide a sufficient strength to resist the forces exposed to the steering column bracket, as well as enabling for improved springing characteristics of the resilient member for proper connection to the laterally extending recess of the steering column walls.

According to an example embodiment, the steering column bracket may further comprise a guiding structure for guiding the steering column bracket to be connected to the steering column.

Hereby, assembling of the steering column bracket to the steering column is simplified.

According to an example embodiment, the guiding structure may comprise a laterally extending protruding portion arranged to prevent a relative vertical displacement between the steering column bracket and the steering column when the steering column bracket is connected to the steering column.

An advantage is that a vertical support is provided for the steering column bracket such that improved resistance of relative vertical movement between the steering column bracket and the steering column is achieved.

According to an example embodiment, the guiding structure may be arranged in a taper shaped form for connection to a corresponding taper shaped form of the steering column.

The taper shaped configuration may provide a stop in the horizontal direction for the steering column bracket when connection the steering column bracket to the steering column. Other shapes are also conceivable.

According to an example embodiment, the steering column bracket may be arranged to support a steering wheel casing arranged in the cabin apartment of the vehicle.

The laterally movable resilient members may comprise a conical portion. This provides for improved fitting of the resilient member to a larger range of tolerances of the steering column walls.

According to a second aspect, there is provided a vehicle comprising a steering arrangement according to any one of the embodiments described above in relation to the first aspect, wherein the steering arrangement is connected to a steering wheel of the vehicle for controlling a pair of wheels of the vehicle.

Further features of, and advantages with, the present invention will become apparent when studying the appended claims and the following description. The skilled person will realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAILED DESCRIPTION OF EXAMPLE EMBODIMENTS OF THE INVENTION

Figure 1:
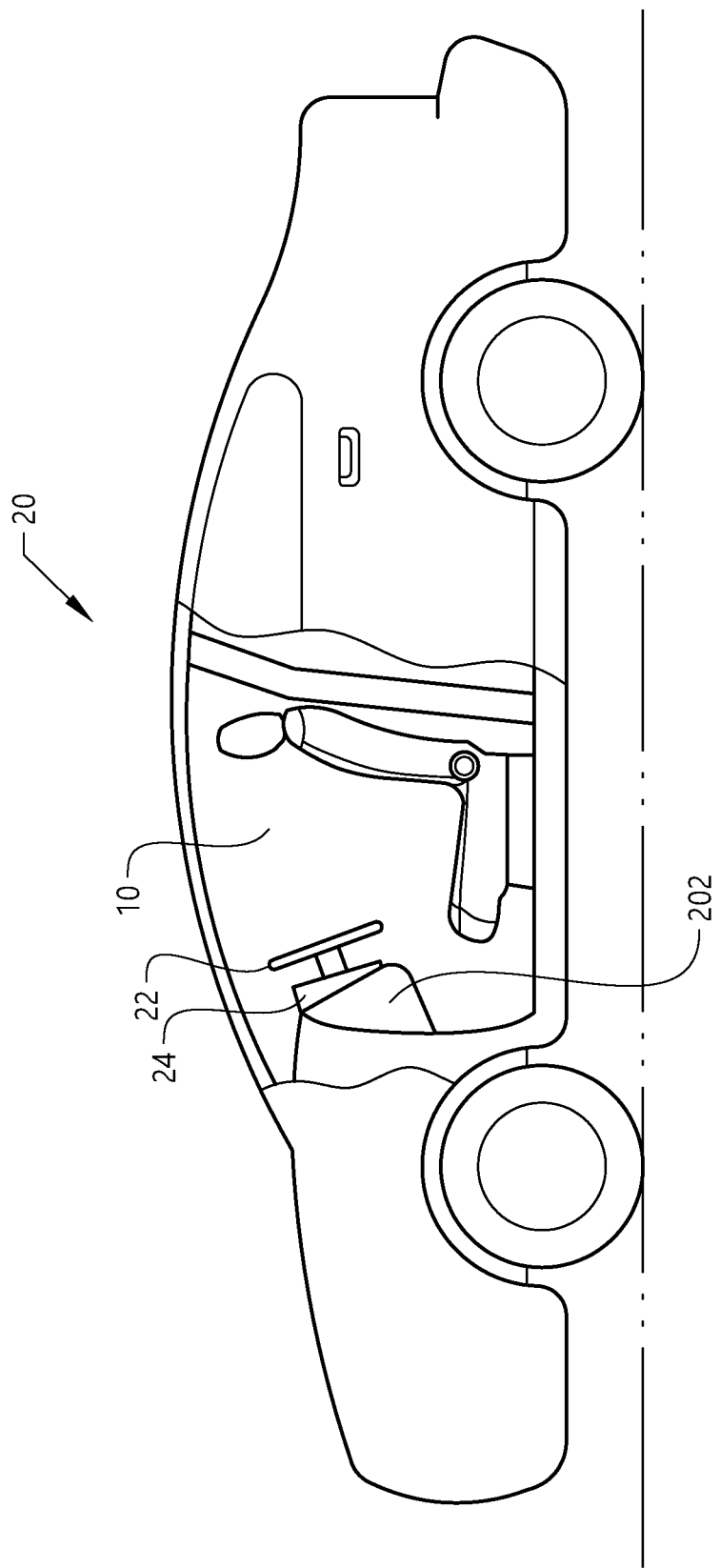
FIG. 1 is a perspective view illustrating an interior compartment of a vehicle according to an example embodiment.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

With reference to FIG. 1, an example embodiment of a cabin compartment, such as e.g. an interior compartment 10, of a vehicle 20 is depicted. As can be seen, the vehicle 20 comprises a steering wheel 22 for controlling the steerable wheels of the vehicle 20. The steering wheel 22 is arranged at a steering compartment 24. The steering compartment 24 in turn comprises a steering wheel casing 202 which is arranged to e.g. hide steering mechanics and electronics for an operator of the vehicle 20. The steering wheel 22 is furthermore connected to a steering arrangement 100 for transmitting the steering torque to the steerable wheels of the vehicle 20.

Figure 2:
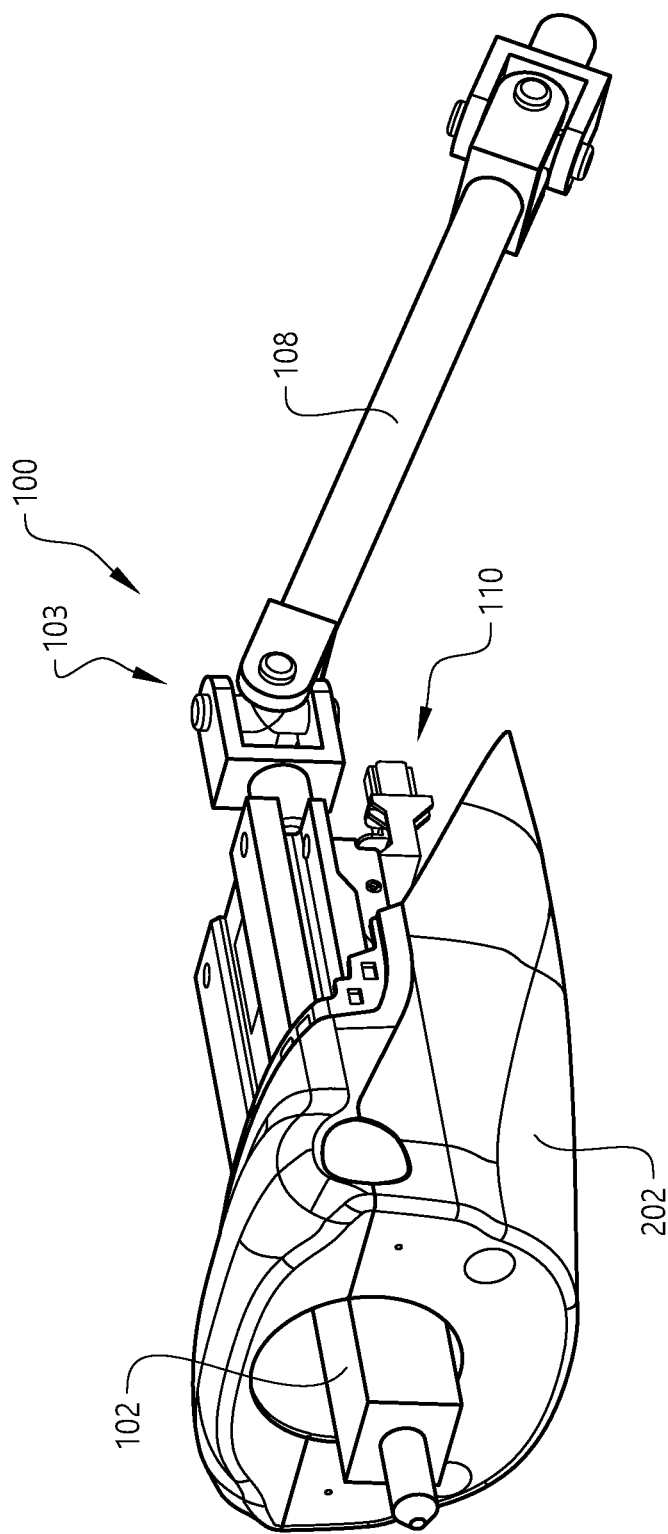
FIG. 2 is a perspective view of a steering arrangement according to an example embodiment.
Figure 3:
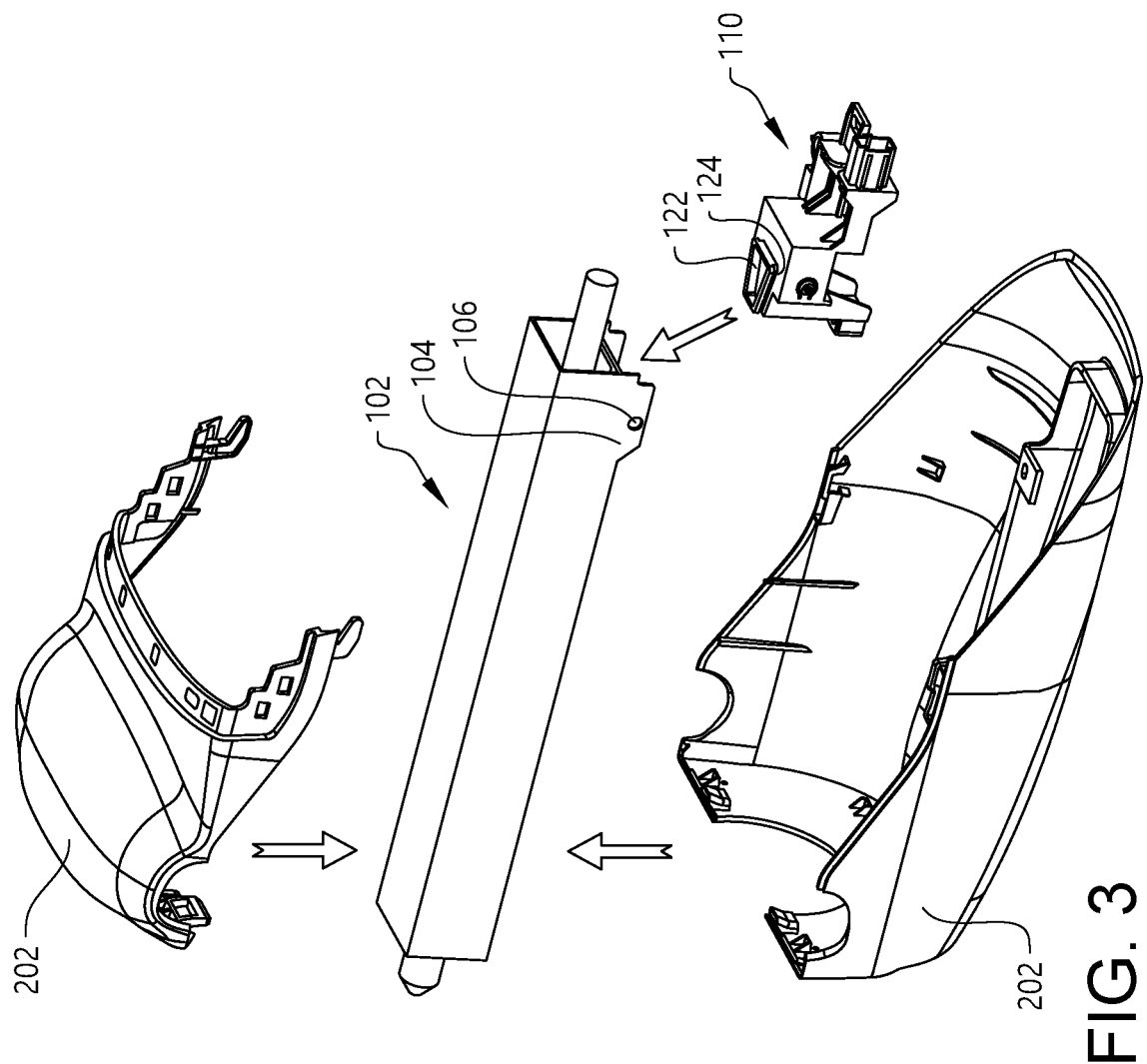
FIG. 3 is an exploded view of the steering arrangement according to an example embodiment.
Figure 4:
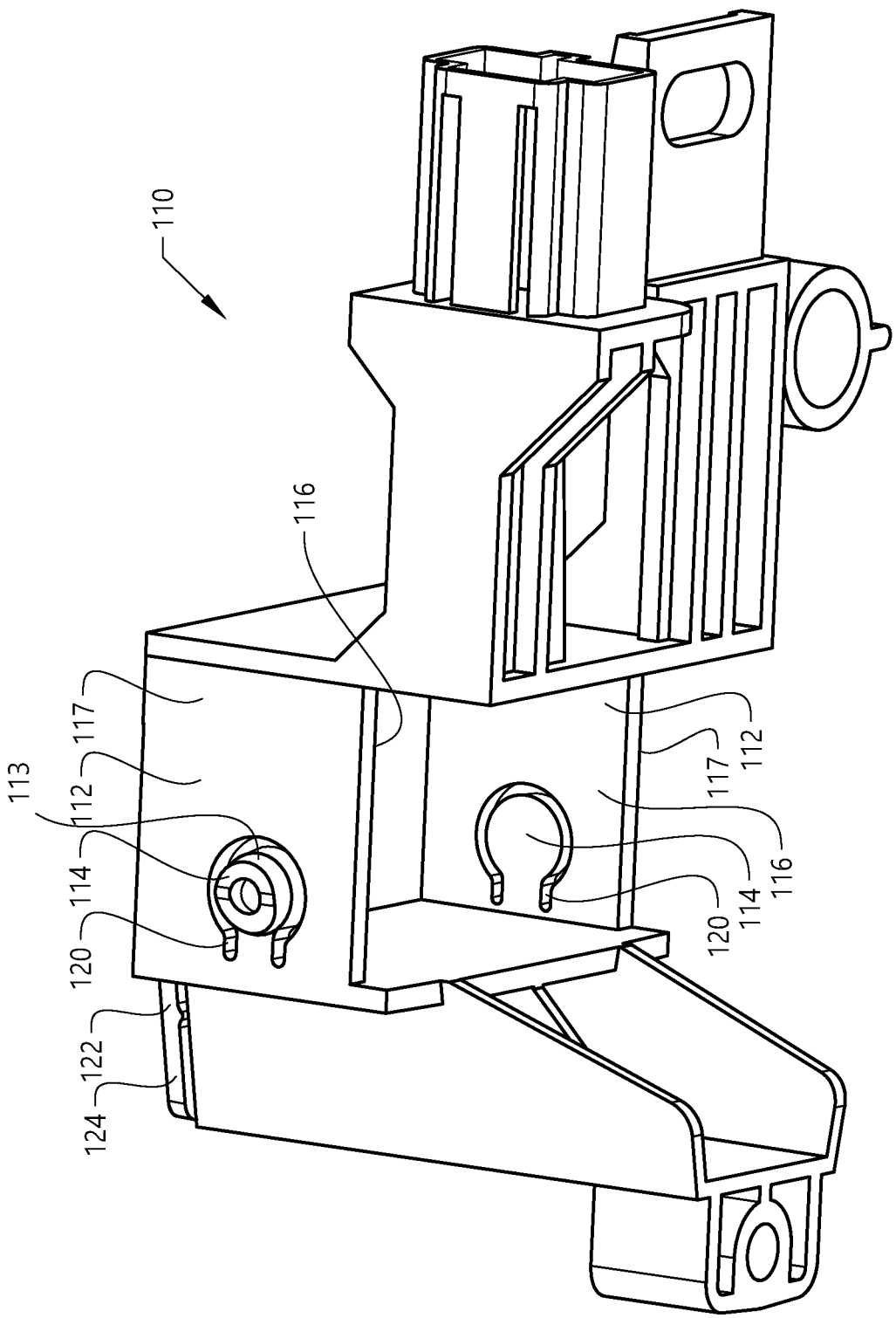
FIG. 4 is a detailed illustration of the steering column bracket according to an example embodiment.

Reference is now made to FIGS. 2-4, which illustrate the steering arrangement 100 according to an example embodiment. In particular, FIG. 2 is a perspective view of the steering arrangement 100, FIG. 3 is an exploded view of the steering arrangement 100 in FIG. 2, and FIG. 4 is a detailed illustration of a steering column bracket 110 according to an example embodiment.

As can be seen, the steering arrangement 100 comprises a steering column 102 arranged to be connected to the steering wheel 22, a steering lever 108 connected to the steering column 102 via a joint connection 103. The joint connection 103 is preferably a cardan joint connection or the like. The steering lever 108 is in turn connected to the wheels of the vehicle via a wheel axle, etc. Moreover, the steering arrangement further comprises a steering column bracket 110 which is connected to the steering column 102 at an underside thereof. The steering column bracket 110 is arranged to e.g. connect to the steering wheel casing 202. Hereby, the steering wheel casing 202 can be sufficiently rigidly connected at the steering compartment 24 depicted in FIG. 1. The steering column bracket 110 may also be arranged to keep cables or the like in position.

As can be seen in FIG. 3, the steering column 102 comprises a pair of steering column walls 104 at which the steering column bracket 110 is connected. The steering column walls 104 each define a plane in the lateral and vertical direction of the steering column 102. As further depicted, the steering column walls 104 comprises a respective recess 106 at which the steering column bracket 110 is connected. The respective recesses 106 are extending in the lateral direction and are preferably arranged as respective through holes in the lateral direction of the steering column 102. The connection of the steering column bracket 110 to the laterally extending through holes 106 are described further below.

Turning to FIG. 4, which is a detailed illustration of the steering column bracket 110 according to an example embodiment. As stated above, the steering column bracket 110 is particularly utilized for holding cables and the steering wheel casing 202 in position. As can be seen, the steering column bracket 110 comprises a pair of bracket walls 112. The bracket walls 112 are arranged such as to form a plane in the longitudinal and vertical direction of the steering column 102 when connected thereto. Hence, the bracket walls 112 are arranged parallel to the steering column walls 104. Each of the bracket walls 112 comprises an inner surface 116 and an outer surface 117, wherein the inner surface 116 faces away from the steering column wall 104 and the outer surface faces the steering column wall 104 when connected thereto.

Furthermore, the steering column bracket 110 comprises a resilient member 114 at the respective one of the bracket walls 112. The resilient members 114 are arranged to be connected to the respective through holes 106 of the steering column walls 104. The resilient members 114 are movable in the lateral direction of the steering column bracket 110, i.e. in a direction parallel to the normal surface of the bracket walls 112. Hereby, the springing characteristics of the laterally movable resilient members 114 forces them laterally outwards and into the respective through holes of the steering column walls when connecting the steering column bracket 110 to the steering column 102.

In further detail, the steering column bracket 110 and the resilient members 114 are preferably formed as a one-piece element. Hence, the resilient members 114 are preferably an integral part of the bracket walls 112. Hereby, the manufacturing of the steering column bracket 110 can thus be made in one piece. By forming the resilient member as an integral part of the bracket walls, no tools are required for assembly of the steering column bracket 110 to the steering column 102 may be required.

Accordingly, the resilient member 114 is preferably formed in the same material as the steering column bracket 110. Such material is preferably a plastic material, although other alternatives are conceivable.

As is further depicted in FIG. 4, the resilient member 114 is formed in a horse-shoe configuration. There is thus provided a cut-through groove 120 in the bracket walls 112. The cut-through groove 120 is preferably arranged in a circular shape and extends between the inner 116 and outer 117 surfaces of the respective bracket walls. The cut-through groove may be arranged in a circular shape of approximately 180-270 degrees. The remaining portion thus constitutes the interface to the bracket wall. Other designs and extensions of the cut-through groove are also conceivable.

In the unloaded condition, the resilient member protrudes from the outer surface 117 of the bracket wall 112 in a direction away from the outer surface 117. When providing a load onto the resilient member 114, such as providing a compression force onto the resilient member 114, the resilient member 114 moves in a direction towards the inner surface 116. Thus, when providing a load onto the resilient member 114, the resilient member 114 protrudes from the inner surface 116 of the bracket wall, in a direction away from the inner surface 116.

Accordingly, when connecting the steering column bracket 110 to the steering column 102, the bracket wall 112 slides against an inner surface of the steering column wall 104. This can be made at substantially any mutual direction between the steering column bracket 110 and the steering column 102 as long as the direction is parallel to the surface of the bracket walls 112. Hereby, the resilient members 112 assume the loaded condition, whereby the resilient members 114 protrude from the respective inner surface 116 of the bracket walls.

Thereafter, when the steering column bracket 110 is arranged at its correct position, i.e. when the resilient members 110 align with the respective laterally extending through holes 106 of the steering column walls 104, the resilient members 114 will be snap-fitted into the respective through hole. Hereby, the respective resilient members 114 will extend into the through holes for attaching the steering column bracket 110 to the steering column 102.

Moreover, the steering column bracket 110 further comprises a guiding structure 122 for guiding the steering column bracket 110 to its correct and assembled position of the steering column 102, which is illustrated in further detail in FIG. 3. The guiding structure may preferably be arranged at a lower portion of the steering column bracket 110 and arranged as laterally extending protruding portions 124 and arranged in connection to a groove portion of the steering column 102. The laterally extending protruding portions 124 may thus serve as a further stop for vertical displacement of the steering column bracket 110 relative to the steering column 102 when connected thereto. The laterally extending protruding portions 124 are in FIG. 3 depicted as continuous portions extending in the longitudinal direction of the steering column bracket 110. Other alternatives, such as individual protrusions, etc. are also conceivable. Also, the guiding structure may be arranged in a taper shaped form for connection to a corresponding taper shaped form of the groove arranged in the steering column.

The resilient member 114 advantageously comprises a conical or chamfered portion. The conical portion 113 provides for improved fitting of the resilient member to a larger range of tolerances of the steering column walls 104 and the though-holes 106 in the steering column 102. In this way, a pre-tension effect may be provided from the resilient member on the steering column walls for an increased range of tolerances. The base of the conical portion 113 is at the bottom of the resilient member 114, i.e. towards the side of the inner surface 116. The narrower side of the conical portion 113 is thus arranged facing the same direction as the outer surface 117, thus facing the steering column wall when the steering column bracket 110 is arranged at its correct position with the resilient members fitted in the through holes 106 of the steering column 102.

It is to be understood that the present invention is not limited to the embodiments described above and illustrated in the drawings; rather, the skilled person will recognize that many changes and modifications may be made within the scope of the appended claims.

The invention claimed is:

1. A steering arrangement for a vehicle, the steering arrangement comprising:
   a steering column connectable to a steering wheel of the vehicle, the steering column comprises a pair of steering column walls, each of the steering column walls comprises a respective laterally extending recess;
   a steering lever connected to the steering column, wherein the steering lever is connectable to the wheels of the vehicle for controlling steering operation thereof; and
   a steering column bracket comprising a pair of bracket walls, each of the bracket walls being arranged in connection with a respective one of the steering column walls, wherein the steering column bracket comprises a laterally movable resilient member on each of the bracket walls, each of the laterally movable resilient members being snap-fitted to a respective one of the laterally extending recesses of the steering column for attaching the steering column bracket to the steering column,
   wherein the laterally movable resilient members are formed by means of a cut-through groove in the respective bracket walls.

2. The steering arrangement according to claim 1, wherein the steering column is at least partially enclosing the steering column bracket.

3. The steering arrangement according to claim 1, wherein each of the laterally movable resilient members forms a respective integral part of the bracket walls.

4. The steering arrangement according to claim 1, wherein each of the laterally movable resilient members is controllable between a first state in which the laterally movable resilient member is snap-fitted to the laterally extending recesses of the steering column, and a second state in which each of the laterally movable resilient members is arranged in abutment with a respective inner surface of the steering column walls.

5. The steering arrangement according to claim 4, wherein the laterally movable resilient members protrude from a respective inner surface of the bracket walls when the laterally movable resilient members assume the second state.

6. The steering arrangement according to claim 4, wherein each of the laterally movable resilient members is arranged in a fully laterally extended position when assuming the first state.

7. The steering arrangement according to claim 1, wherein the laterally extending recess of the steering column is a through hole extending through the steering column wall.

8. The steering arrangement according to claim 1, wherein the cut-through groove is formed as a horse shoe.

9. The steering arrangement according to claim 1, wherein the steering column bracket further comprises a guiding structure for guiding the steering column bracket to be connected to the steering column.

10. The steering arrangement according to claim 9, wherein the guiding structure comprises a laterally extending protruding portion arranged to prevent a relative vertical displacement between the steering column bracket and the steering column when the steering column bracket is connected to the steering column.

11. The steering arrangement according to claim 9, wherein the guiding structure is arranged in a taper shaped form for connection to a corresponding taper shaped form of the steering column.

12. The steering arrangement according to claim 1, wherein the steering column bracket is arranged to support a steering wheel casing arranged in the cabin compartment of the vehicle.

13. The steering arrangement according to claim 1, wherein the laterally movable resilient members comprise a conical portion.

14. A vehicle comprising a steering arrangement according to claim 1, wherein the steering arrangement is connected to a steering wheel of the vehicle for controlling a pair of wheels of the vehicle.

* * * * *